United States Patent [19]
Johnson

[11] Patent Number: 5,233,827
[45] Date of Patent: Aug. 10, 1993

[54] RADIATION SUPRESSION

[75] Inventor: Douglas Johnson, Indianapolis, Ind.

[73] Assignee: General Motors Corporation, Detroit, Mich.

[21] Appl. No.: 44,343

[22] Filed: Jun. 8, 1970

[51] Int. Cl.$^5$ .............................................. F02K 3/04
[52] U.S. Cl. .................................... 60/226.1; 60/39.5; 60/262; 60/271
[58] Field of Search ............... 60/271, 226, 39.11, 60/39.5, 39.75, 262, 226, 264, 271; 138/40, 37, 39

[56] References Cited
U.S. PATENT DOCUMENTS
3,030,005 4/1962 Habour et al. ..................... 60/264

Primary Examiner—Stephen C. Bentley
Attorney, Agent, or Firm—Saul Schwartz

[57] ABSTRACT

An arrangement to mask direct view of the discharge end of a turbine through an exhaust duct extending downstream from the turbine. The turbine has an annular outlet. Two annular rows of fixed vanes are mounted in the outlet, one immediately upstream of the other. The two sets of vanes are reversely cambered so that the overall turning effect is insignificant and they are so located that each set of vanes blocks sight of the turbine through the gaps between the vanes of the other set.

2 Claims, 1 Drawing Sheet

RADIATION SUPRESSION

The invention herein described was made in the course of work under a contract or subcontract thereunder with the Department of Defense.

DESCRIPTION

My invention is directed to an arrangement for masking off an annular duct, and particularly to an arrangement for masking off the exhaust duct of a gas turbine so that the turbine blades are not visible through an exhaust duct extending downstream from the turbine.

It has long been realized that it may be quite desirable under certain circumstances to minimize visibility of the turbine of a gas turbine engine or, in other words, to minimize direct radiation from the hot parts of the engine out the exhaust pipe or jet nozzle of such an engine. Some explanation of this may be found in U.S. patent to C. H. Smale for Jet Engine Exhaust, U.S. Pat. No. 3,210,934, Oct. 12, 1965. The Smale patent discloses one form of exhaust nozzle particularly adapted to minimize radiation from the turbine.

My invention is directed to another approach to the problem which is relatively simple and which may be equally or more suitable under certain conditions and to meet certain requirements. Briefly, in its preferred embodiment, my invention minimizes visibility of the turbine through the exhaust duct or, conversely, radiation from the turbine, by the use of two relatively staggered rows of reversely cambered turning vanes in the annular outlet from the turbine. The projected area of the vanes covers the entire area of the exhaust duct so that the parts ahead of it are no longer directly visible through the exhaust duct.

This arrangement leads to a very great reduction in radiation with relatively simple structure and with substantially no reduction in the effective thrust of a jet engine or increase in exhaust back pressure in other turbine type engines. The invention as illustrated herein is embodied in an engine of the ducted fan or bypass type but is clearly applicable to turbine engines of other configurations.

The principal objects of my invention are to reduce radiation from the hot parts of engines through the exhaust ducts of the engines, more particularly to reduce radiation from a turbine through its exhaust duct, and, further, to effect such reduction in radiation with a minimum of interference with the efficiency of the engine The nature of my invention and its advantages will be clearly apparent to those skilled in the art from the succeeding detailed description of the preferred embodiment thereof and the accompanying drawings.

Figure 1:
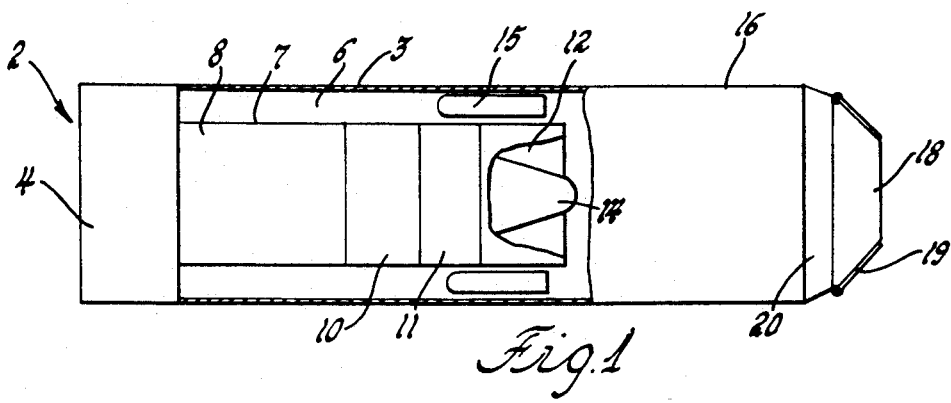
FIG. 1 is a schematic view of a ducted fan type turbojet engine.

FIG. 1 is a schematic illustration of a ducted fan type engine which may be considered, so far as the present invention is concerned, to be conventional. It is a representation of an engine of the sort described in greater detail in my U.S. Pat. No. 3,528,250.

To describe it briefly, the turbojet engine 2 shown in FIG. 1 includes an annular outer case 3 which is roughly cylindrical. A fan 4 at the inlet of the engine discharges air under some pressure into a fan duct 6 bounded by the wall 3 and bounded by the wall 7 which is the housing or outer case of a gas turbine engine which drives the fan 4. Such a gas turbine engine ordinarily includes a compressor section 8, a combustion section 10, and a turbine section 11. The turbine or turbines 11 drive the fan 4 and a compressor or compressors 8 to compress air which is heated in the combustion section 10 and energizes the turbines. The final turbine stage exhausts into an annular outlet 12 defined between the wall 7 and an inner cone 14. Duct burners 15 to heat the air flowing through the fan duct 6 are also illustrated. The air or gas discharged from the fan duct 6 and from the turbine outlet 12 flow through an exhaust duct 16, otherwise called a tailpipe, which effectively is a continuation of the outer wall 3 of the engine. The exhaust duct terminates in a suitable discharge port or outlet jet nozzle 18. The jet nozzle 18 comprises a ring of movable flaps 19 hinged to a converging end portion 20 of the exhaust duct. Any suitable means for moving the flaps concurrently inwardly and outwardly to vary the nozzle area may be provided. Other nozzle arrangements might be used if desired, but the nozzle arrangement as such is immaterial to my invention.

As previously indicated, my present invention is concerned with a arrangement in the turbine outlet 12 for masking the turbine outlet from the jet nozzle 18 so that the hot turbine blades are not visible through the nozzle, or, conversely, radiation from the turbine blades does not reach the nozzle except in a diminished and scattered condition.

Figure 2:
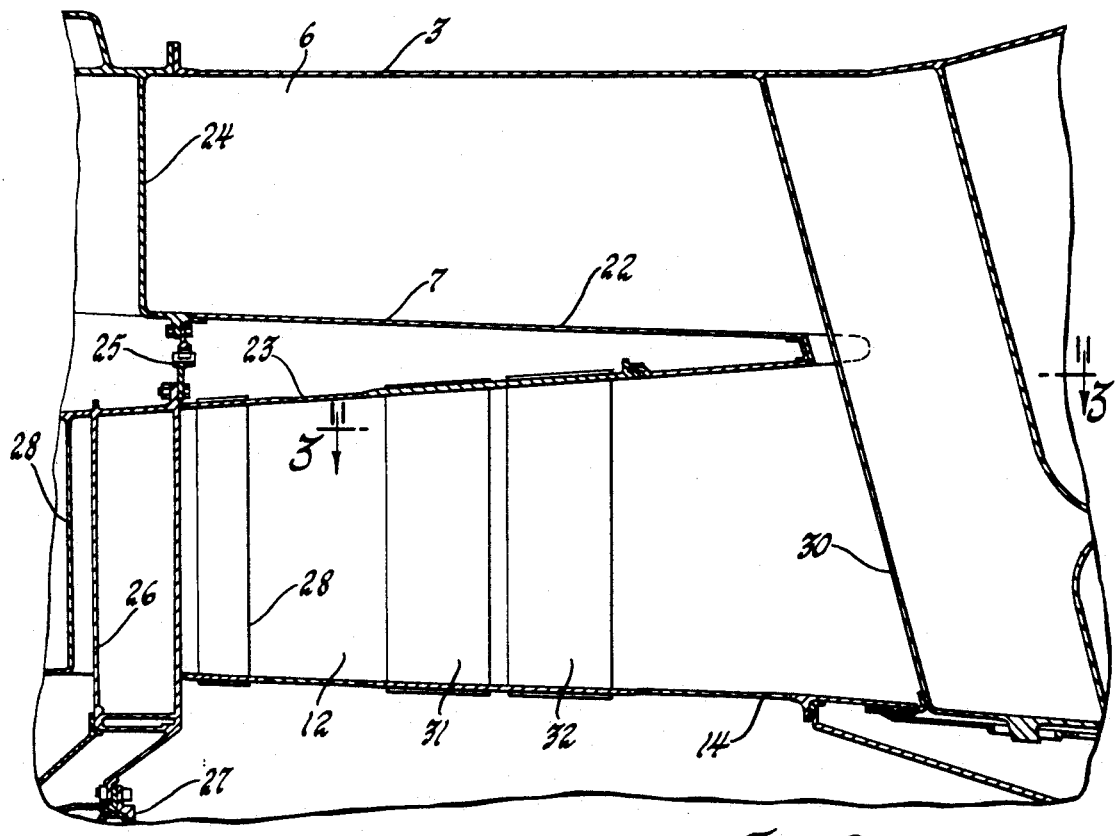
FIG. 2 is a sectional view of the turbine outlet portion and adjacent parts of such an engine, the section being taken on a plane containing the axis of the turbine.
Figure 3:
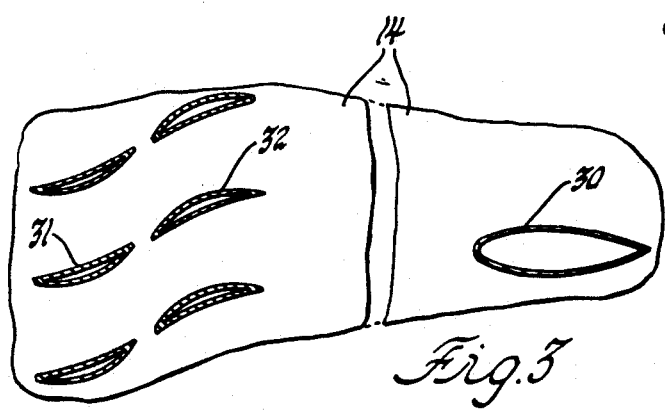
FIG. 3 is a fragmentary sectional view taken on the plane indicated by the line 3—3 in FIG. 2.

FIGS. 2 and 3 show details not apparent from the schematic of FIG. 1. FIG. 2 shows the outer case 3 and the inner case 7, the inner case actually at this point being a double walled structure comprising an inner duct wall 22 and a turbine case 23. Struts 24 extending from the outer case across the duct 6 support the turbine case through an expansion connection 25 and also support struts 26 which extend to a rear turbine bearing support 27 which mounts the turbine rotor (not illustrated). The struts 27 are isolated from the turbine exhaust within fairings 28. The turbine exhaust gases are discharged through the annular turbine outlet 12 defined between the turbine case 23 and the inner cone 14, previously referred to. Struts 30 extending inward from the outer case provide support for the inner cone and may also mount an afterburner (not illustrated).

The structure so far described may be regarded as conventional so far as my invention is concerned and has been described primarily to define an environment within which the invention is useful. The turbine masking arrangement according to my invention is provided by the two rows or cascades of vanes 31 and 32 extending from the outer wall 23 to the inner wall 14. These vanes are radial, or substantially so, and may be of any suitable airfoil configuration. As illustrated, they are hollow and may be welded at their ends to the walls 23 and 14. It should be noted that the vanes are cambered and are so set that the vanes 31 of the first annular cascade impart swirl to the exhaust gases and the vanes 32 which have opposite camber and setting angle are effective to contribute reverse swirl or, in other words, to cancel out the swirl imparted by the vanes 31. The overall effect of these blades on the gas flow is very slight. There will, of course, be some minimal interference to gas flow from the flow around the vanes 31 and 32 and through the gaps between them. However, any throttling or interference with flow will be insubstantial.

It should be noted that the projection of vanes 31 on a plane perpendicular to the axis of the nozzle is such as to cover slightly more than half of the total area. The same is true of vanes 32, and these are staggered with respect to vanes 31 so that the entire annulus of the turbine outlet is covered by the area of the two sets of vanes projected on a plane perpendicular to the axis. The result is an effective mask to prevent direct radiation from the turbine to the nozzle 18 and one which is simple in structure and has but a minimal effect upon total pressure of exhaust flow or turbine back pressure.

The simplicity and utility of the arrangement will be apparent to those skilled in the art. It will also be apparent that the utility of the invention is not limited to a ducted fan type engine and that vanes such as 31 and 32 might be put in any annular turbine outlet.

It may be desirable to mention the fact that thermal radiation from the structures of the exhaust duct may be reduced by cooling such structures. Since various arrangements for cooling exhaust ducts of jet engines for this purpose or to increase the strength and resistance to erosion of the metal are known, it is not deemed necessary to include a disclosure of cooled walls or other structures in this application. Exhaust duct cooling arrangements are shown, for example, by the Smale patent referred to above. Particularly, it is desirable to cool the vanes 31 and 32 in this case The detailed description of preferred embodiments of the invention for the purpose of explaining the principles thereof is not to be considered as limiting or restricting the invention, as many modifications may be made by the exercise of skill in the art

I claim:

1. An arrangement for masking the outlet of a gas turbine, the turbine having an annular outlet and having a tailpipe extending from the outlet and terminating in a discharge port for the turbine exhaust, the said outlet including an outer wall and an inner wall; the masking arrangement comprising a first annular cascade of vanes extending between the walls adapted to swirl the turbine exhaust flow and a second annular cascade of vanes extending between the walls downstream of the first cascade adapted substantially to eliminate the swirl in the exhaust flow, the vanes of the two cascades being circumferentially staggered so as to mask the entire outlet from the discharge port.

2. A gas turbine engine comprising a gas turbine having an annular outlet for motive fluid defined by an outer wall and an inner wall, an exhaust duct extending from the outlet, and a discharge nozzle at the terminus of the exhaust duct, in combination with means for masking the turbine from the nozzle comprising a first annular cascade of vanes extending between the said walls adapted to swirl the turbine exhaust flow and a second annular cascade of vanes extending between the said walls downstream of the first cascade adapted substantially to eliminate the swirl in the exhaust flow, the vanes of the two cascades being circumferentially staggered so as to mask the entire outlet from the discharge port.

* * * * *